(12) United States Patent
Glantz et al.

(10) Patent No.: US 7,213,343 B2
(45) Date of Patent: *May 8, 2007

(54) DUAL AXIS SINGLE MOTOR PLATFORM ADJUSTMENTS SYSTEM

(75) Inventors: Michael F. Glantz, Kettering, OH (US); James N. Hayes, Urbana, OH (US); Brian C. Kemp, Troy, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,383

(22) Filed: Jun. 28, 2006

(65) Prior Publication Data

US 2006/0242851 A1    Nov. 2, 2006

Related U.S. Application Data

(63) Continuation of application No. 10/821,009, filed on Apr. 8, 2004, now Pat. No. 7,096,591.

(51) Int. Cl.
*G01C 15/02* (2006.01)

(52) U.S. Cl. ........... 33/290; 33/286; 33/DIG. 21

(58) Field of Classification Search .......... 33/281, 33/282, 285, 286, 290, 568, 569, 573, DIG. 21; 356/138

See application file for complete search history.

(56) References Cited

U.S. PATENT DOCUMENTS

| 4,062,634 | A | * | 12/1977 | Rando et al. | 356/149 |
|---|---|---|---|---|---|
| 4,629,321 | A | * | 12/1986 | Hart et al. | 356/148 |
| 5,485,266 | A | * | 1/1996 | Hirano et al. | 33/281 |
| 5,572,796 | A | * | 11/1996 | Breda | 33/285 |
| 5,606,802 | A | * | 3/1997 | Ogawa | 356/138 |
| 5,636,018 | A | * | 6/1997 | Hirano et al. | 356/248 |
| 5,655,307 | A | * | 8/1997 | Ogawa et al. | 33/291 |
| 5,852,492 | A | * | 12/1998 | Nimblett et al. | 356/5.04 |
| 6,035,540 | A | * | 3/2000 | Wu et al. | 33/286 |
| 6,628,373 | B2 | * | 9/2003 | Kahle | 33/366.11 |
| 6,675,489 | B2 | * | 1/2004 | Ohtomo et al. | 33/290 |
| 6,792,685 | B1 | * | 9/2004 | Ng et al. | 33/286 |
| 6,906,310 | B1 | * | 6/2005 | Jiang et al. | 33/290 |
| 6,931,739 | B2 | * | 8/2005 | Chang et al. | 33/286 |
| 7,096,591 | B2 | * | 8/2006 | Glantz et al. | 33/286 |
| 2001/0025425 | A1 | * | 10/2001 | Haijima et al. | 33/281 |
| 2002/0092185 | A1 | * | 7/2002 | Wu | 33/281 |
| 2003/0101605 | A1 | * | 6/2003 | Tacklind et al. | 33/286 |
| 2006/0048399 | A1 | * | 3/2006 | Chang | 33/286 |

FOREIGN PATENT DOCUMENTS

EP    0699891 A1 *  3/1996

\* cited by examiner

*Primary Examiner*—G. Bradley Bennett
(74) *Attorney, Agent, or Firm*—Dinsmore & Shohl LLP

(57) ABSTRACT

An arrangement for use in a light beam projection device for adjusting an orientation of a projected light beam is disclosed. The arrangement comprises a base frame, a support platform adapted to set the orientation of the projected light beam, and a pivot member pivotally mounting the support platform relative to the base frame. A tilting motor is provided to the base frame and has a pair of output shafts influencing the orientation of the support platform, whereby rotation of the output shafts in a first direction tilts the support platform only along a first axis, and rotation of the output shafts in a second direction tilts the support platform only along a second axis. A power supply is provided for driving the tilting motor.

20 Claims, 5 Drawing Sheets

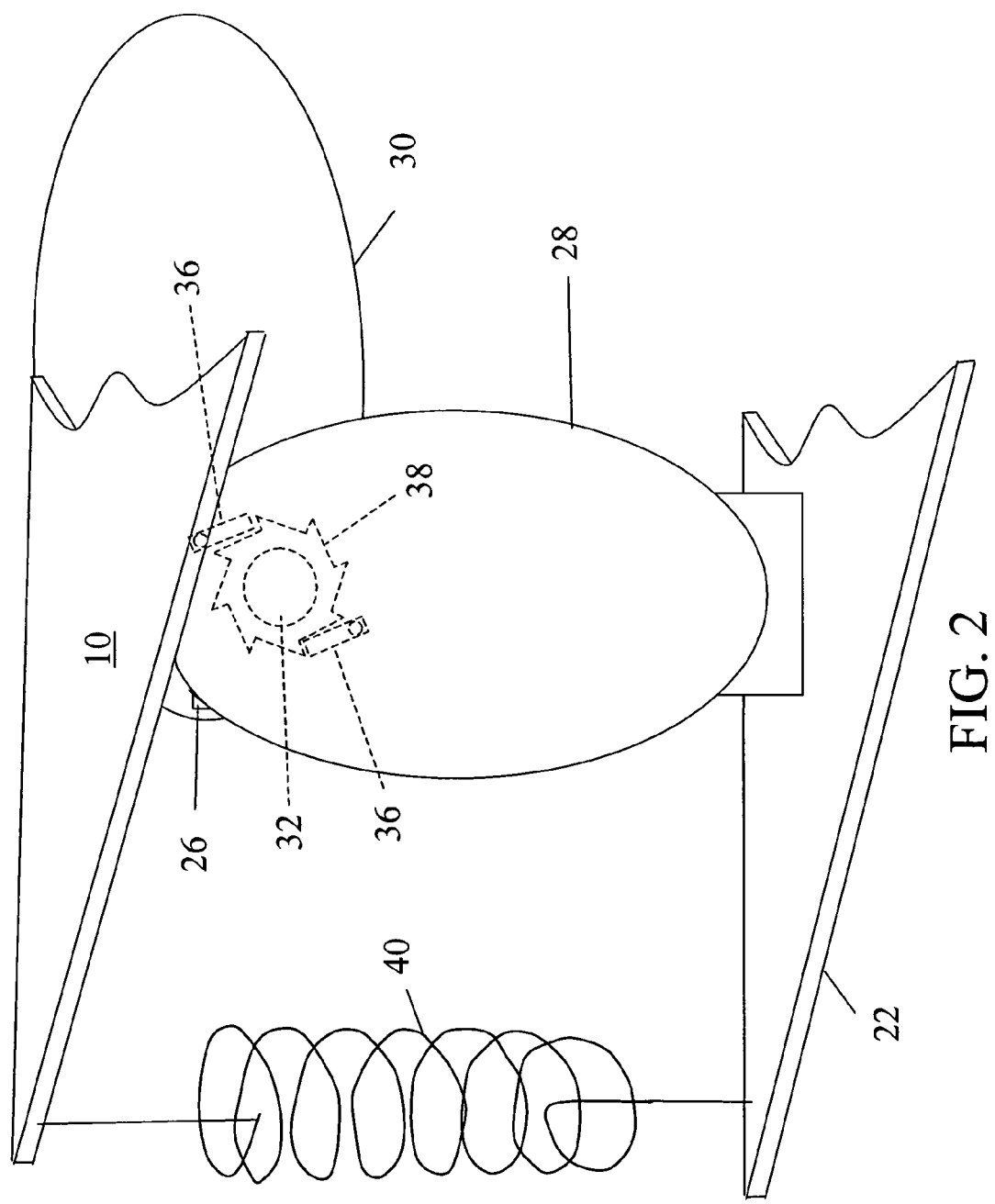

DUAL AXIS SINGLE MOTOR PLATFORM ADJUSTMENTS SYSTEM

CROSS REFERENCE TO RELATED APPLICATIONS

This application is a continuation of application Ser. No. 10/821,009, filed Apr. 8, 2004 now U.S. Pat. No. 7,096,591.

BACKGROUND OF THE INVENTION

The present invention relates to a laser beam projection device and, more particularly, to an arrangement for permitting control of the orientation of a rotating laser beam.

A number of different laser beam systems have been employed in the past for surveying and construction applications to provide a rotating reference beam of laser light. This reference plane of light permits ready measurement of elevations and grades. Further, earth moving and other construction equipment may be fitted with laser light sensing devices which may be coupled through control systems to effect automatic or semi-automatic control of the equipment.

A laser beam projector typically employs a rotating reflective assembly which sweeps the beam in a horizontal plane or a selected tilted plane. Some prior art projectors have included visually readable tilt sensors and manually adjustable screws for orienting the projector in the desired attitude. Such a projector is disadvantageous in that its accuracy is dependent in part upon the skill of the operator in the initial adjustment of the orientation of the projector. Moreover, a subsequent unnoticed disturbance of the device can cause erroneous measurements to be taken.

Other prior art projectors have included electrical sensors which sense the orientation of the support platform and provide electrical signals used by a feedback control system. The feedback control system actuates electric motors to move the support platform into a position in which the sensors are leveled. When the reference laser plane is to be oriented at an angle to the horizontal, a grade motor for each desired axis is actuated by the operator to tilt the sensor with respect to the support platform. The feedback control system then reorients the support platform to bring the sensor provided for that axis back into its level position, thus tilting the frame by the desired amount. It will be appreciated that this requires a number of motors to accomplish the orientation of the sensors and the support platform along multiple axis, and is relatively complex and expensive.

Accordingly, there remains a need for an arrangement for use in a laser beam projection device which adjusts the orientation of a support platform in a simple fashion.

SUMMARY OF THE INVENTION

In one embodiment, an arrangement for use in a light beam projection device for adjusting an orientation of a projected light beam is disclosed. The arrangement comprises a base frame, a support platform adapted to set the orientation of the projected light beam, and a pivot member pivotally mounting the support platform relative to the base frame. A tilting motor is provided to the base frame and has a pair of output shafts influencing the orientation of the support platform, whereby rotation of the output shafts in a first direction tilts the support platform only along a first axis, and rotation of the output shafts in a second direction tilts the support platform only along a second axis. A power supply is provided for driving the tilting motor.

In another embodiment, an arrangement for use in a light beam projection device for adjusting an orientation of a projected light beam is disclosed. The arrangement comprises a base frame, a support platform adapted to set the orientation of the projected light beam, and a pivot member pivotally mounting the support platform relative to the base frame. A tilting motor is provided to the base frame and has a pair of output shafts operably connected to respective ones of a pair of cams via a respective unidirectional clutch. The cams engage the support platform, whereby rotation of the output shafts in a first direction rotates only one of the cams and rotation of the output shafts in a second direction rotates only the other one of the cams, whereby the cams adjust the orientation of the support platform, and thus the orientation on the projected light beam. A power supply is provided for driving the tilting motor.

In still another embodiment, an arrangement for use in a light beam projection device for adjusting an orientation of a projected light beam is disclosed. The arrangement comprises a base frame, a support platform adapted to set the orientation of the projected light beam, and a pivot member pivotally mounting the support platform relative to the base frame. A tilting motor is provided to the base frame and has a pair of output shafts operably connected to respective ones of a pair of cams via a respective unidirectional clutch. The cams engage the support platform, whereby rotation of the output shafts in a first direction rotates only one of the cams and rotation of the output shafts in a second direction rotates only the other one of the cams, whereby the cams adjust the orientation of the support platform, and thus the orientation on the projected light beam. A control system controls the tilting motor, and at least one tilt sensor is provided for providing an electrical signal representing a sensed orientation of the support platform to the control system for operating the tilting motor closed loop. A power supply is provided for driving the tilting motor.

These and other features and advantages of the invention will be more fully understood from the following description of the various embodiments of the invention taken together with the accompanying drawings. It is noted that the scope of the claims is defined by the recitations therein, and not by the specific discussion of features and advantages set forth in the present description.

BRIEF DESCRIPTION OF THE DRAWINGS

The organization and manner of operation of the invention, together with further objects and advantages thereof, may best be understood by reference to the following description taken in connection with the accompanying drawing in which:

FIG. 2 is a side view of the device of FIG. 1, with portions of a support platform broken away and other parts removed for convenience of illustration, and showing a clutch design embodiment according to the present invention;

DETAILED DESCRIPTION

Figure 1:
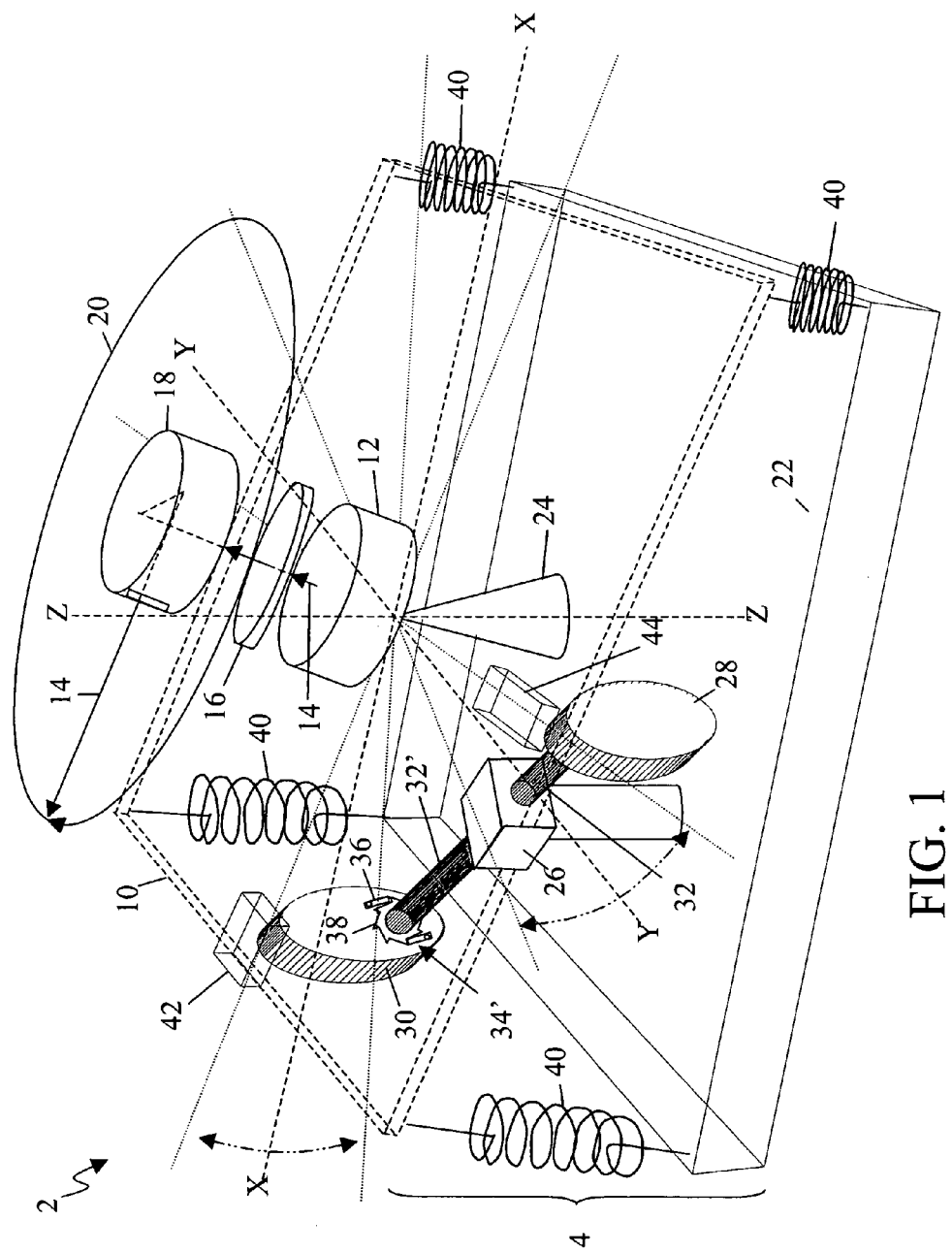
FIG. 1 is a perspective view of a portion of a laser beam projection device with parts removed for convenience of illustration, and showing a dual-axis, single motor, platform adjustment system according to the present invention.

While the invention may be susceptible to embodiment in different forms, there is shown in the drawing, and herein will be described in detail, specific embodiments with the understanding that the present disclosure is to be considered an exemplification of the principles of the invention, and is not intended to limit the invention to that as illustrated and described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the various embodiments of the present invention.

Reference is now made to FIG. 1 which illustrates a portion of a laser beam projection device 2 providing a dual-axis, single motor, platform adjustment system 4 constructed according to the invention. The adjustment system 4 is used to adjust and control the orientation (pitch and roll) of a support platform 10 upon which a laser beam source 12 is mounted. It is to be appreciated that many of the parts situated within the laser beam projection device 2 and mounted to or around the support platform 10 have been removed from FIG. 1 for convenience of illustration.

As depicted, the laser beam source 12 directs a beam 14 upward through lens 16. In one embodiment, the laser beam source 12 is a diode pumped laser producing a visible beam in the range of about 635 to about 690 nm. In other embodiments, the laser beam source 12 may be any suitable 400–700 nm, Class II or Class IIIa laser source known in the prior art. In the illustrated embodiment, the beam 14 is then reflected at a right angle by a rotating assembly 18, which is supported on top of the support platform 10, so as to define a reference plane 20. The rotating assembly 18 reflects the beam 14 at an angle of 90° to the incident beam path, and may be a prism such as a pentaprism, rhomboid prism, any other reflective surface, or arrangement which provides the beam 14 horizontally. Therefore, the orientation of the reference plane 20 is directly related to the orientation (pitch and roll) of the support platform 10.

A base frame 22 is pivotally supported relative to the support platform 10 by a pivot member 24. In one embodiment, the pivot member 24 is provided on the base frame 22. In another embodiment, the pivot member 24 may take the form of a gimbal arrangement. In both embodiment, the pivot member 24 supports the support platform 10 along a first axis, labeled as Z in FIG. 1, and permits the support platform 10 to pivot independently about two orthogonal axes, labeled as X and Y in FIG. 1, which represent the axes about which the support platform 10 pitch and roll in a Cartesian coordinate system.

A tilting motor 26 mounted to the base frame 22 pivots the support platform 10. The tilting motor 26 is bidirectional and provides double output shafts 32 and 32' that extend outwardly from the tilting motor 26 in opposite directions. Generally, rotation of output shafts 32 and 32' of the tilting motor 26 in a first direction tilts the support platform only along a first axis, such as for example the X axis, and rotation of the output shafts in a second direction tilts the support platform only along a second axis, such as for example, the Y axis.

In one embodiment, the tilting motor 26 is a stepping motor which provides an angular resolution of about a minute of arc in each of the X and Y axes. It is to be appreciated that providing a finer angular resolution is also well within the scope and spirit of the present invention. In other embodiments, the tilting motor 26 may be a pulse motor, or a brushless DC motor.

In one embodiment, cams 28 and 30 are mounted to respective ends of the output shafts 32 and 32'. The pair of cams 28 and 30 abut the underside of the support platform 10 along respective chord lines between points on the X and Y axes, and serve as the positioning mechanism for the support platform 10. As depicted, the cams 28 and 30 each have a non-circular shape over at least a portion of their exterior surface, such as for example, elliptical, parabolic, and/or hyperbolic surface portions. In one embodiment, the shape of cams 28 and 30 are the same such that a tilt angle of ±5° in both the X and Y axes is selectable. However, it is to be appreciated that in another embodiment the shapes of cams 28 and 30 may be different to provide varying ranges of tilt between the X and Y axes. Additionally, in still other embodiments, the output shafts 32 and 32' could be worm gears engaging respective worm wheels. However, it is to be appreciated that any other suitable gearing arrangement know in the art, which provides adjustment of the support platform 10 only in one axis when the tilting motor 26 is rotated in one direction and only in another axis when the tilting motor 26 is rotated in a second direction, may be used.

Figures 3A, 3B:
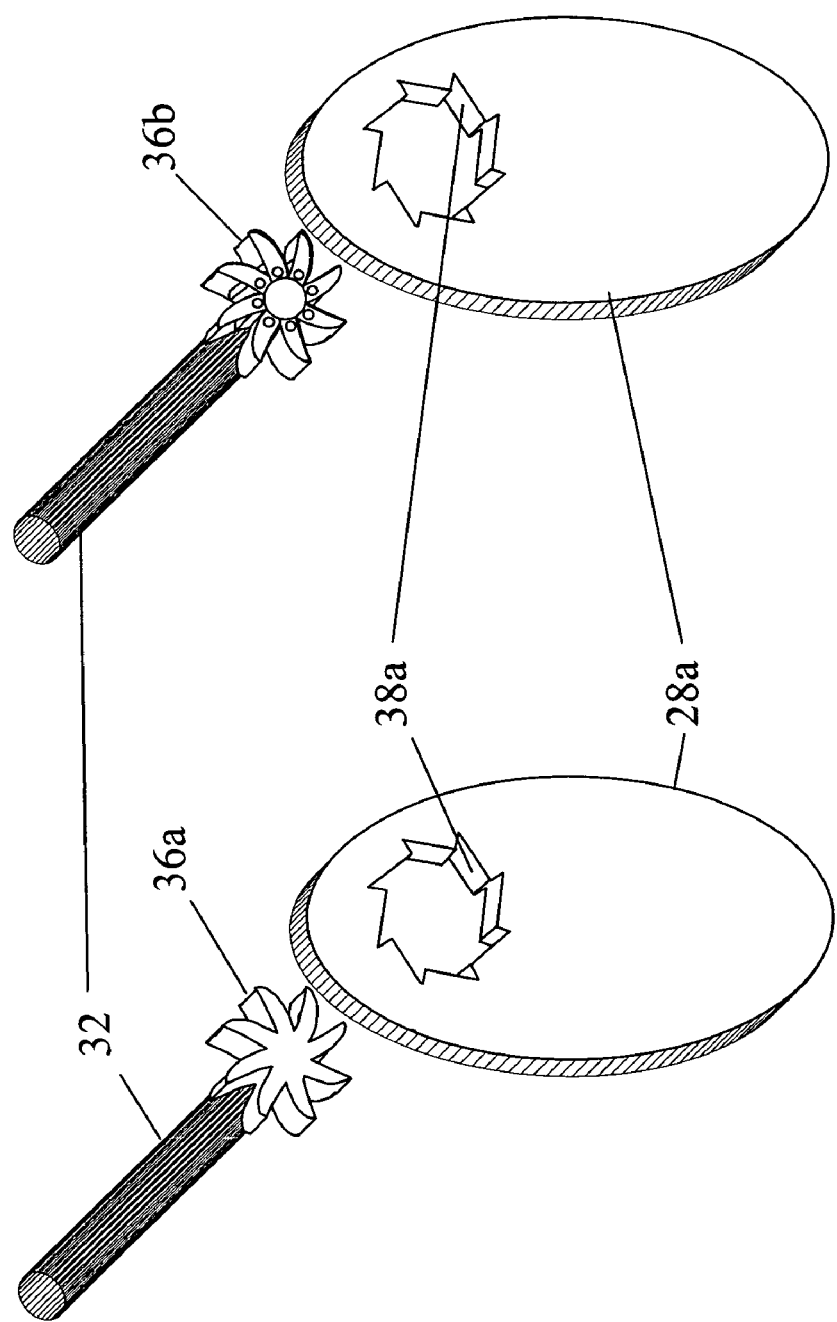
FIGS. 3A and 3B are partially exploded views of various clutch design embodiments according to the present invention.

As best shown by FIG. 2, in one embodiment the first end of output shaft 32 interfaces with its respective cam 28 via a unidirectional clutch 34 which transmits a torque load in only one direction and overruns freely in opposite direction. For example, in one embodiment the unidirectional clutch 34 comprises a pawl 36 and ratchet 38 arrangement. In still other embodiments, illustrated by FIGS. 3A and 3B, the unidirectional clutch 34 comprises a semi-flexible pawl 36a, or a springing pawl 36b mounted to the output shaft 32 which engages a ratcheted portion 38a of the cam 28a in one rotational direction, but which slips in the opposite rotational direction.

The semi-flexible pawl 36a may be of a material and construction which gives way or compresses in the slip direction, but which is stiff or stiffens in the opposite direction. Likewise, the springing pawl 36b comprises a plurality of teeth that fold in the slip direction, but which opens under spring tension and is limited in the range of motion in the opposite direction. It is also to be appreciated that any conventionally known unidirectional clutch, such as those having rollers wedge between a shaft and an outer race, may also be used without departing from the scope and spirit of the present invention.

With reference made also to FIG. 1, another unidirectional clutch 34' is provided between cam 30 and output shaft 32' for turning its respective cam in the opposite direction. For example, in one embodiment, counterclockwise rotation of the output shafts 32 and 32' causes cam 28 to rotate as the pawl 36 engages the ratchet 38, whereas the other unidirectional clutch 34' provided to cam 30 slips simultaneously. In this manner, only the orientation of the support platform 10 along the Y-axis is adjusted. On the other hand, clockwise rotation of the output shafts 32 and 32' causes the unidirectional clutch 34' provided to cam 30 to slip, while rotating simultaneously the cam 28 situated along the Y axis. In this manner, only the orientation of the support platform 10 along the X-axis is adjusted.

Turning back to FIG. 1, biasing members 40 are mounted between the support platform 10 and the base frame 22. In the illustrated embodiment, the support platform 10 and the base frame 22 are urged together under the influence of biasing members 40 positioned in the illustrated embodiment at the corners thereof. As mentioned previously, cams 28 and 30 situate the support platform 10 in a desire orientation. Via biasing members 40, the support platform 10 will remain in that desired orientation under tension. Examples of suitable biasing members 40 include springs, elastic bands, flexible materials, and the like.

In another embodiment, the support platform 10 further includes single axis tilt sensors 42 and 44, which are provided along the X and Y axes, respectively. The tilt sensors 42 and 44 provide a gravity reference for detecting tilting of the support platform 10, and each provide an electrical signal which indicates the orientation of the support platform 10 in their respective axis. This permits the tilting motor 26 to move the support platform 10, via cams 28 and 30, to a desired orientation by controlling the operation of the tilting motor 26a with a control system, such as the example discussed hereafter. Examples of suitable tilt sensors 42 and 44 include electrolytic tilt sensors, MEMS tilt sensors, tilt transducers, and the like. It is to be appreciated that, if desired, instead of or in addition too the single axis tilt sensors 42 and 44, a single dual-axis tilt sensor providing pitch and roll measurements and centrally located along the Z-axis may also be used without departing from the scope and spirit of the invention.

Figure 4:
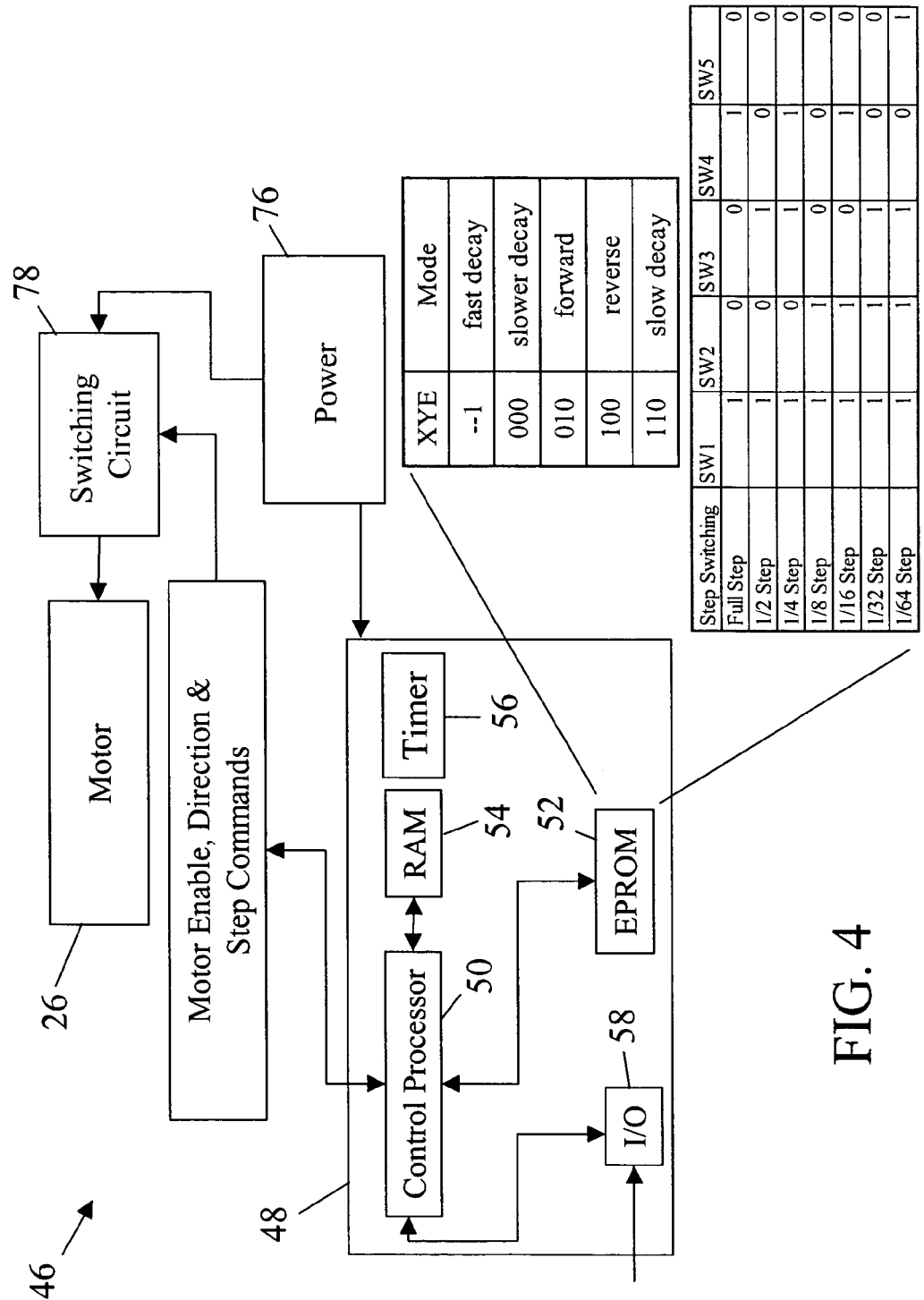
FIG. 4 is a block diagram of one example of a control system of a dual-axis, single motor, platform adjustment system according to the present invention.
Figure 5:
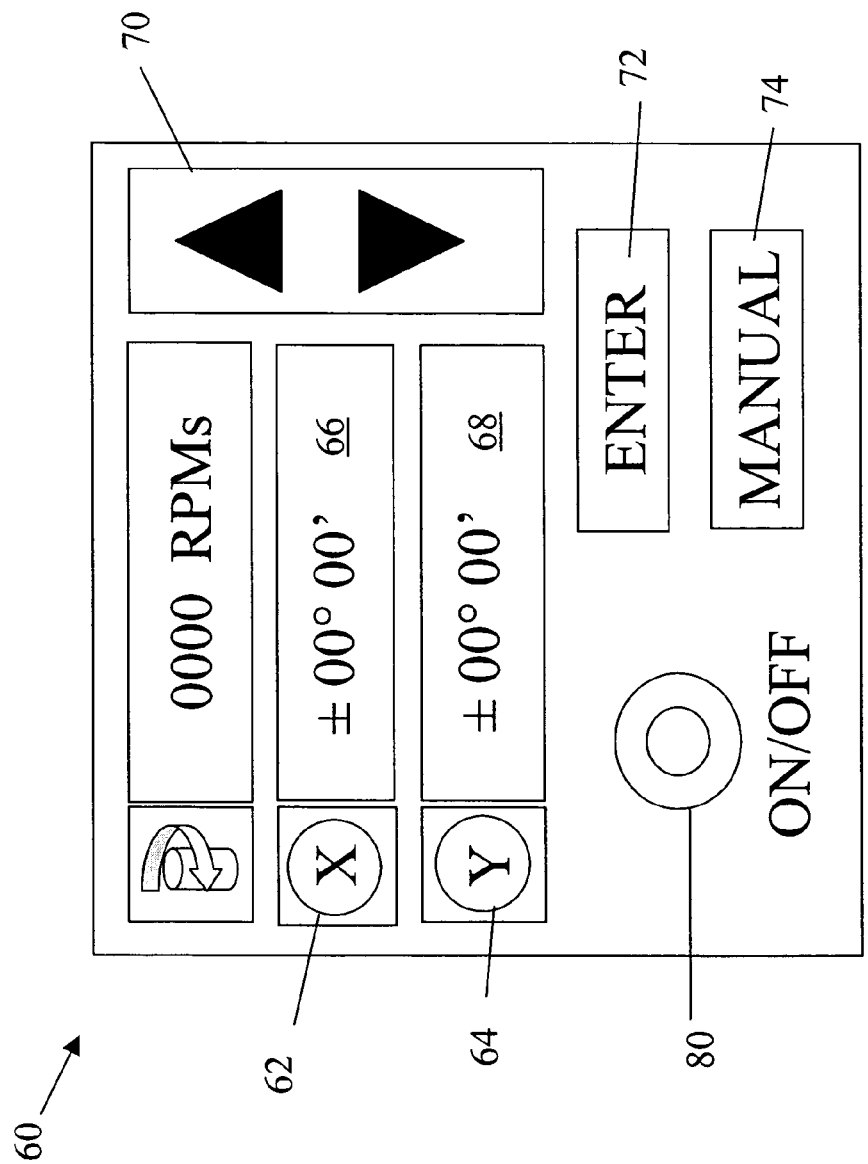
FIG. 5 is a block diagram of one example of a user interface of a dual-axis, single motor, platform adjustment system according to the present invention.

FIG. 4 shows a schematic block diagram of an embedded control system 46 in accordance with the present invention. As depicted, the control system drives the tilting motor 26 to position the support platform 10 in a desire orientation. The control system includes a control circuit 48, such as a reduced instruction set computer (RISC) controller, to compute the necessary motor rotational direction and number of steps to achieve the desired orientation. The control circuit 48 comprises a processor 50 with electronically programmable nonvolatile memory (e.g., EPROM) 52. The processor 50 provides various functional controls facilitated with on board static random access memory (SRAM) 54, a timer/counter 56, input and output ports (I/O) 58 as well as a user interface 60, which is illustrated by FIG. 5.

The user interface 60 is used for generating signals for controlling various aspects of the control circuit 48 as discussed further below. As depicted, the user interface 60 provides a pair of tilt angle input keys 62 and 64 for selecting a desired orientation of reference plane 20 in the X and Y axes, respectively. The numerical values of the preset desired orientation for the two axes X and Y are displayed on display units 66 and 68, respectively, and may be adjusted up or down by an adjuster key 70. It is to be appreciated that in another embodiment a numerical keypad may also serve the same function of inputting a desired X-Y orientation.

In one embodiment, an enter key 72 is provided such that the desired X-Y orientation may first be determined and displayed in the display units 66 and 68. After selecting the enter key 72, the control system 46 will adjust the support platform 10, via cams 28 and 30, to bring the support platform to the preset desired orientation displayed in displayed unit 66 and 68. Input keys 62 and 64 may illuminate a different color to indicate that the support platform 10 is at the desired orientation (e.g., red to green), via feedback control provided by sensors 42 and 44, and control circuit 48. In another embodiment, selecting a manual select key 74, one of the angle input keys 62 or 64, and then the adjuster key 70 permits a user to adjust the orientation of the support platform 10 manually.

Turn back to FIG. 4, a power supply 76, such as batteries, provides the necessary current to the control circuit 48 and motor 26. A switching circuit 78, controlled by the output of the control circuit 48, is used to switch the current from the power supply 76 to the desired poles of motor 26 for micro-stepping, direction, and braking control. In one embodiment, the switching circuit may be a H-bridge circuit for operating the motor in either forward or reverse directions, and for micro-stepping and braking. However, it is to be appreciated that other types of bridges may be utilized within the scope of the invention.

In the present embodiment, the reference plane 20 formed by the laser beam 14 can be set in a horizontal direction or at an arbitrary angle thereto. Description will now be given of the leveling operation of the above laser projection device when it forms a horizontal reference plane.

When the device 2 is energized via an on/off switch 80 (FIG. 5), the support platform 10 is generally not at a horizontal position. Assuming that the device 2 and the tilt sensors 42 and 44 are properly calibrated and with a "zero" grade (i.e., a horizontal reference plane) entered into the display units 66 and 68, the control system 46 being responsive to the tilt sensors 42 and 44 will cause the support platform 10, via cams 28 and 30, to pivot until the tilt sensors 42 and 44 are in their null or reference position. This will result in the support platform 10 to orient horizontally with respects to gravity to a high degree of accuracy. As a consequence, the laser beam 14 will provide a horizontal reference plane 20 substantially level with gravity.

Next, description will be given in the case where the reference plane 20 formed by the laser beam 14 is set to an arbitrary angle in the X and Y axes.

The target tilt angles in the X and Y axes for the reference plane 20 are inputted to the control system 46 by angle keys 62 and 64, adjuster 70, and enter key 72 or manually by manual key 74, angle keys 62 and 64, and adjuster 70. The processor 48 compares the detected results of the tilt sensors 42 and 44 to the inputted arbitrary angle to see if they are in agreement. If not, the deviation of angles detected by the two tilt sensors 42 and 44 and the inputted arbitrary X-Y angles are obtained.

The control system 46 then drives the tilting motor 26 in a first direction to rotate cam 28, thereby adjusting the tilt of the support platform 10 in a first axis (i.e., Y axis). As mentioned previously, cam 30 slips as cam 28 turns in the first direction, thereby the orientation along the second axis (i.e., X axis) is unaffected. The orientation of the support platform 10 is detected continually by tilt sensor 44 and inputted to control processor 50 via input output ports 58. By the control processor 50, deviation between the detection angle of the tilt sensor 44 and the inputted arbitrary X-axis angle is continually updated. Accordingly, the tilting motor 26 is driven until the calculated angular deviation becomes zero.

The same process as described above is then repeated for the Y axis, wherein the tilting motor 26 is driven in the opposite direction until the calculated angular deviation between the detected angle of the tilt sensor 42 and the inputted arbitrary Y-axis angle becomes zero. When the calculated angular deviation becomes zero in both axis, the laser reference plane 20 will be set in the desired orientation displayed on display units 66 and 68, wherein the control processor 50 may change the illumination of the X and Y angle keys 62 and 64 (e.g., red to green) to provide a visual indication of this condition. It is to be appreciated that other modes of providing a visual indication may be provided without departing from the spirit and scope of this invention.

In another embodiment, the control system 46 is operated open-looped using a stepper motor for the tilting motor 26. In this embodiment, the processor 50 performs a table look-up to select a mode of operation (forward, reverse, braking), and the number of micro-steps to perform, such that the respective cams will position the support platform 10 in the desire orientation. Accordingly, the processor 50 functions as an electronic driver operating the tilting motor 26 via step, direction, and enable commands.

In the open loop control embodiment, the nonvolatile memory 52 stores tilt angles of the support platform 10 and associated number of micro-steps of the tilting motor 26 necessary to adjust the support platform 10 between the range of available X and Y tilt angels. In this manner, the number of micro-steps corresponding to the angles set by the arbitrary angle setters 62 and 64 can be recalled by the processor 50, and using modular math along with a store value for the previous steps in the X and Y axis, the specific number of steps needed to move the support platform 10 to the desire orientation can be derived. In such an embodiment, neither tilt sensor nor shaft encoders are needed, as the stepper motor 26 is commanded to move the derived specific number of steps to adjust the support platform 10 to a new desired orientation from its previous orientation and stop. In this open loop position control system, motor position is known simply by keeping track of the last number of the steps correlated to the previous orientation of the support platform 10, and the number of input step pulses provided by the processor 50 to the switching circuit 78, such as via timer/counter 56.

Having described the invention in detail and by reference to preferred embodiments thereof, it will be apparent that modifications and variations are possible without departing from the scope of the invention defined in the appended claims. For instance, although the laser beam source 12 is mounted on and moves with the support platform 10 in the above described embodiment, it will be apparent that a projection device may be configured according to the present invention with a stationary laser beam source mounted below the support platform 10 on the base frame 22, and with appropriate optics mounted on the support platform in the path of the beam for diverting the beam into the desired orientation.

What is claim is:

1. A controllable plane orientation device comprising:
   a support platform; and
   a tilting motor having a pair of output shafts configured to tilt said support platform only along a first axis in a first rotational direction, and to tilt said support platform only along a second axis in a second rotational direction.

2. The controllable plane orientation device of claim 1 further comprising a pivot member pivotally supporting said support platform.

3. The controllable plane orientation device of claim 1 further comprising a base, and a pivot member pivotally supporting said support platform relative to said base.

4. The controllable plane orientation device of claim 1 further comprising a light beam projection device provided to said support platform.

5. The controllable plane orientation device of claim 1 further comprising a base; and a pivot member pivotally supporting said support platform relative to said base, wherein said tilting motor is provided to a base.

6. The controllable plane orientation device of claim 1 wherein said first axis is a pitch axis and said second axis is roll axis.

7. The controllable plane orientation device of claim 1 further comprising a base; pivot member pivotally supporting said support platform relative to said base; and biasing members mounted between said support platform and said base.

8. The controllable plane orientation device of claim 1 further comprising cams and a pair of unidirectional clutches operably connecting said output shafts to respective ones of said cams.

9. The controllable plane orientation device of claim 1 further comprising a tilt sensor sensing pitch and roll of the support platform.

10. The controllable plane orientation device of claim 1 further comprising first and second tilt sensors, said first tilt sensor sensing pitch of said support platform and said second tilt sensor sensing roll of said support platform.

11. The controllable plane orientation device of claim 1 further comprising a control system controlling said tilting motor.

12. The controllable plane orientation device of claim 1 further comprising a control system controlling said tilting motor; and a tilt sensor connected to said control system, said tilt sensor sensing pitch and roll of The support platform.

13. The controllable plane orientation device of claim 1 further comprising a control system controlling said tilting motor; and first and second tilt sensors connected to said control system, said first tilt sensor sensing pitch of said support platform and said second tilt sensor sensing roll of said support platform.

14. The controllable plane orientation device of claim 1 further comprising a control system controlling said tilting motor; and at least one tilt sensor for providing an electrical signal representing a sensed orientation of said support platform to said control system for operating said tilting motor closed loop.

15. The controllable plane orientation device of claim 1 further comprising a control system controlling said tilting motor and having a user interface for inputting into said control system a desired orientation of said support platform; and at least one sensor for providing a signal representing a sensed orientation of said support platform to said control system, wherein said control system is configured to drive said tilting motor until the sensed orientation is equal to the desired orientation.

16. The controllable plane orientation device of claim 1 further comprising a control system controlling said tilting motor and having a user interface for inputting into said control system a desired orientation of said support platform, wherein said titling motor is a stepper motor, and said control system is configured to drive said tilting motor a specific number of steps to adjust said support platform to the desired orientation.

17. The controllable plane orientation device of claim 1 further comprising a control system controlling said tilting motor and having a user interface for inputting into said control system a desired orientation of said support platform, wherein said titling motor is a stepper motor, and said control system is configured to drive said tilting motor a specific number of steps to adjust said support platform to the desired orientation from a previous orientation, wherein said control system keeps track of the number of the steps correlated to the previous orientation of the support platform in order to determine the specific number of steps to perform.

18. The controllable plane orientation device of claim 1 further comprising a control system controlling said tilting motor and having a user interface for inputting into said control system a desired orientation of said support platform, wherein said titling motor is a stepper motor, and said control system is configured to drive said tilting motor a specific number of steps to adjust said support platform to the desired orientation from a previous orientation, wherein the control system performs a table look-up to select the specific number of steps to perform.

19. The controllable plane orientation device of claim 1 further comprising a light beam projection device provided to said support platform; a control system controlling said tilting motor and having a user interface for inputting into said control system a desired orientation of said support platform; and at least one sensor for providing a signal representing a sensed orientation of said support platform to said control system, wherein said control system is configured to drive said tilting motor until the sensed orientation is equal to the desired orientation.

20. The controllable plane orientation device of claim 1 farther comprising a light beam projection device provided to said support platform; a base; a pivot member pivotally supporting said support platform relative to said base; a control system controlling said tilting motor and having a user interface for inputting into said control system a desired orientation of said support platform; and at least one sensor for providing a signal representing a sensed orientation of said support platform to said control system, wherein said control system is configured to drive said tilting motor until the sensed orientation is equal to the desired orientation.

* * * * *

UNITED STATES PATENT AND TRADEMARK OFFICE
CERTIFICATE OF CORRECTION

PATENT NO. : 7,213,343 B2  Page 1 of 1
APPLICATION NO. : 11/478383
DATED : May 8, 2007
INVENTOR(S) : Glantz et al.

It is certified that error appears in the above-identified patent and that said Letters Patent is hereby corrected as shown below:

Column 3, Line 59 - "bidirectional" should read --bi-directional--;

Column 8, Line 23 - "The" should read --the--;

Column 8, Line 50 "titling" should read --tilting--;

Column 8, Line 58 "titling" should read --tilting--;

Column 9, Line 3 "titling" should read --tilting--; and

Column 10, Line 4 - "farther" should read --further--;

Signed and Sealed this

Twenty-fifth Day of December, 2007

JON W. DUDAS
*Director of the United States Patent and Trademark Office*